Aug. 18, 1942.    J. A. PARKER    2,293,356
GAS STORAGE AND DISPENSING APPARATUS
Filed Jan. 25, 1940    2 Sheets-Sheet 1
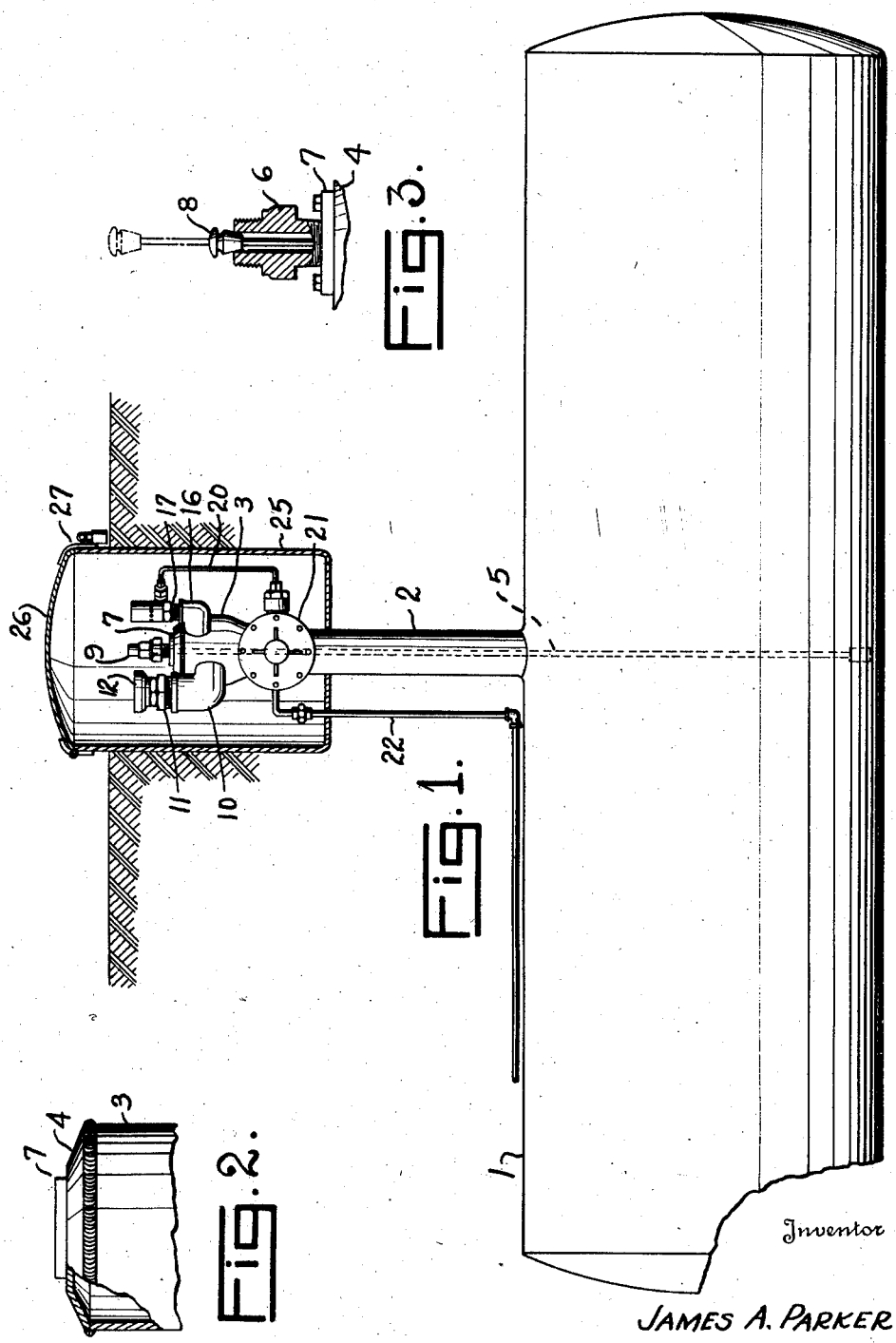
Inventor
JAMES A. PARKER
By
E. V. Hardway
Attorney

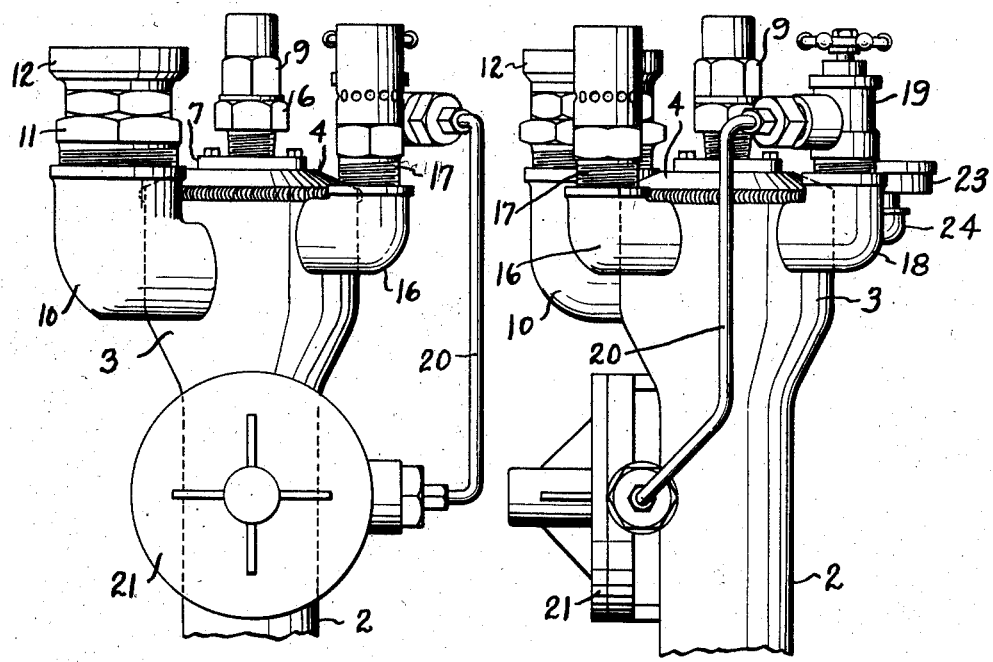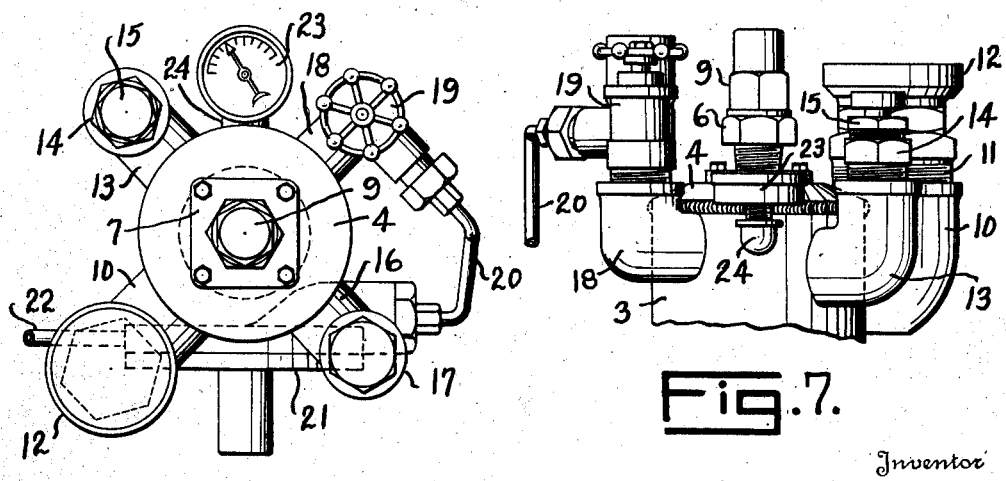

Patented Aug. 18, 1942

2,293,356

UNITED STATES PATENT OFFICE 2,293,356

GAS STORAGE AND DISPENSING APPARATUS

James A. Parker, Houston, Tex.

Application January 25, 1940, Serial No. 315,515

2 Claims. (Cl. 62—1)

This invention relates to gas storage and dispensing apparatus.

An object of the invention is to provide a compact and simple installation, on a tank for the storage of liquefied gas, of filling and dispensing means whereby the tank may be conveniently filled and the gas accumulated therein readily delivered to the consumer, said delivery means embodying a regulator for controlling the delivery of the gas.

More specifically the invention embodies novel means for supporting and protecting the filling and dispensing equipment.

A further object of the invention is to provide in filling and dispensing equipment for gas tanks an upstanding delivery pipe, preferably welded to the tank and whose upper end is expanded to form a bell-shaped head which is closed by a top plate welded thereto with the filling and dispensing fittings welded to the head with means anchored to the delivery pipe and completely enclosing and protecting the filling and dispensing equipment carried by the head.

With the above and other objects in view the invention has particular relation to certain novel features of construction, arrangement of parts and use, an example of which is given in this specification and illustrated in the accompanying drawings, wherein:

Figure 1 shows a side view of the tank showing the filling and dispensing equipment mounted thereon, the enclosing hood being shown in section.

Figure 2 shows a fragmentary, side elevation of the head, partly in section.

Figure 3 shows an enlarged, fragmentary, sectional view of the slip tube gauge employed.

Figure 4 shows a side elevation of the head showing the filling and dispensing equipment associated therewith.

Figure 5 shows a plan view thereof.

Figure 6 shows a side elevation taken at right angles to the view shown in Figure 4, and Figure 7 shows a fragmentary, side elevation showing the opposite side of the head from that shown in Figure 4.

Referring now more particularly to the drawings wherein like numerals of reference designate the same parts in each of the figures, the numeral 1 designates a storage tank preferably cylindrical in form and horizontally arranged and adapted to be buried beneath the ground surface. Welded to the top of the tank, and upstanding therefrom, there is a delivery tube 2. This tube is relatively small, in practice having a two and one- half inch outside diameter. Its upper end is enlarged forming a bell-shaped head 3 whose upper end is closed by a top plate, or cap, 4 which is welded thereto. The top plate has a central opening through which the gauge rod 5 works. Aligned with this opening there is the nipple 6 which is threaded into the anchor plate 7 which in turn is bolted to the top plate 4. The upper end of the rod 5 is provided with a grip 8 which is normally enclosed by the closure cap 9 threaded onto the upper end of the nipple 6.

The gauge rod is provided for the usual purpose of determining the amount of liquid in the tank 1. Any selected type of measuring device may be employed. There is a filler elbow welded to the head with its outer end upturned and equipped with a filler valve mechanism 11 of conventional construction. The upper end of the casing of this filler valve is outwardly threaded to receive a filler hose connection whereby it may be connected with the delivery hose leading to the tank truck or other source of supply. The installation has been particularly designed for storing and dispensing normal butane or other similar liquefied petroleum gas. When the tank 1 is charged with a supply of liquid the upper end of the casing of the valve 11 may be closed by a removable plug 12.

As liquefied gas is being delivered into the tank 1 vaporized gas in the tank is allowed to escape into the filling tank through the elbow 13 which is welded to the head and whose upper end is equipped with a vapor equalizing valve 14. The upper end of the casing of the vapor equalizing valve is threaded to receive the connection of the hose leading back to the filling tank. When said connection is disconnected the upper end of the casing of the vapor equalizing valve may be closed by the cap 15. This vapor equalizing valve is also of conventional construction.

The numeral 16 designates an elbow which is welded to the head 3 and whose outer end is upturned and equipped with a safety valve 17 of conventional construction to relieve excessive pressures in the tank 1. The numeral 18 designates an elbow which is welded to the head 3 and through which the gas to be utilized is delivered. The delivery of gas is regulated by a conventional type of hand operated regulating valve 19. The gas passes through said valve 19 and through the tube 20 to a conventional pressure regulator 21 from which the delivery line 22 leads to the point of utilization.

The head also carries a pressure gauge 23 which is mounted on the upper end of the elbow 24 welded to the head.

The head and fittings carried thereby and hereinbefore described are preferably located slightly beneath the surface of the ground. They are enclosed and protected by a suitable hood 25 whose lower end is closed. The delivery tube 2 and the delivery line 22 extend through the bottom of the hood and are welded thereto to form water tight joints. The upper end of the hood extends above the ground surface so that the head 3 and the fittings carried thereby will be enclosed within a water tight chamber.

The hood 25 is provided with a cover 26 hinged thereto at one side and provided with a latch 27 at the other side whereby the cover may be latched in closed position.

The drawings and description are illustrative merely, while the broad principle of the invention will be defined by the appended claims.

What I claim is:

1. Dispensing apparatus for use with a liquefied gas dispensing system having a gas generating and storage tank, composed of a single stand pipe welded to the tank and of relatively small diameter, the upper end of said stand pipe being enlarged forming a bell-shaped head which is integral with the stand pipe, a top plate welded to the head and forming the top of the head and provided with a central opening through which a gauge rod may be inserted into the tank, an anchor plate bolted to said top plate, a nipple attached to the anchor plate and aligned with said opening and forming a housing adapted to enclose the upper, or grip, end of the gauge rod, a closure cap detachably secured to the upper end of said nipple, a filler elbow welded to the side of the head with its outer end upturned and adapted for the attachment of a filler valve mechanism thereto, a relief elbow welded to the side of the head and having its outer end upturned and adapted for the connection of a vapor equalizing valve thereto, a safety relief elbow welded to the side of the head and whose outer end is upturned and adapted to receive a safety valve, a service elbow welded to one side of the head and whose outer end is upturned forming a service line connection and adapted to receive a manually operable regulating valve, a pressure regulator connected to the side of the stand pipe beneath the head and a tube leading from the said regulating valve to the pressure regulator from which the service line leads.

2. Dispensing apparatus for use with a liquefied gas dispensing system having a gas generating and storage tank; comprising a single stand pipe welded to, and upstanding from, the tank, the upper end of said stand pipe being enlarged forming a bell-shaped head which is integral with the stand pipe and of substantially greater cross-sectional area that that of the stand pipe, a top plate welded to the head and forming the top thereof and provided with a central opening, an anchor plate bolted to the top plate, a nipple attached to the anchor plate and aligned with said opening and forming a housing for the grip of a gauge rod extended through the opening, a closure cap detachably secured to the upper end of the nipple, a filler elbow welded to the side of the head with its outer end upturned, a filler valve mechanism attached to said upturned end and having a filler hose connection, a removing plug secured to said connection, a relief elbow welded to the side of the head and having its outer end upturned, a vapor equalizing valve connected to the upturned end of said relief elbow and having a hose connection and a closure cap screwed onto said connection, a safety relief elbow welded to the side of said head and whose outer end is upturned, a safety valve carried by the upturned end of said safety relief elbow, a service elbow welded to the side of the head and whose outer end is upturned forming a service line connection, a manually operable regulating valve on said connection, a pressure regulator carried by the side of the stand pipe beneath the head for regulating the pressure of the gas flowing through the service line and a tube leading from said regulating valve to the pressure regulator through which gas may flow to the pressure regulator and thence to the service line.

JAMES A. PARKER.